United States Patent [19]
Chauvel et al.

[11] 3,891,592

[45] June 24, 1975

[54] PROCESS FOR PRODUCING RUBBER POLYMER LATICES WITH LARGE PARTICLES

[75] Inventors: Bernard Chauvel, Ermont; Jean-Claude Daniel, Fontenay-sous-Bois, both of France

[73] Assignee: Rhone-Progil, Courbevoie, France

[22] Filed: July 10, 1974

[21] Appl. No.: 487,217

[30] Foreign Application Priority Data
July 11, 1973 France .............................. 73.25393

[52] U.S. Cl. .......... 260/29.7 E; 260/29.7 NE; 260/29.7 PT; 260/29.7 SE
[51] Int. Cl.² ........................ C08L 9/04; C08L 9/08
[58] Field of Search ...... 260/29.6 PT, 29.6 E, 260/29.7 PT, 29.7 E, 29.7 NE, 29.7 SE, 29.6 ME

[56] References Cited
UNITED STATES PATENTS
3,288,741  11/1966  Cheng ........................... 260/29.7 PT
3,318,831  5/1967  Gauslaa ......................... 260/29.7 PT

OTHER PUBLICATIONS

Noble, Latex In Industry, pp. 190–193, (Rubber Age 1953), [TS1890 N75].

*Primary Examiner*—Melvin Goldstein
*Assistant Examiner*—T. DeBenedictis, Sr.

[57] ABSTRACT

Process for the preparation of a latex, containing large particles, of a rubber polymer comprising a homopolymer or copolymer of a conjugated aliphatic diolefin. The process comprises polymerizing the diolefin in aqueous emulsion and introducing a polyalkyleneglycol in the course of polymerization when at least 40% by weight of polymer is formed. The latices produced can be used for the preparation of foams and for the synthesis of graft polymers.

11 Claims, No Drawings

PROCESS FOR PRODUCING RUBBER POLYMER LATICES WITH LARGE PARTICLES

The present invention concerns a process for the preparation of rubber polymer latices with large particles, which are particularly suited for the preparation of graft polymers.

Rubber polymer latices are generally prepared by homopolymerization or copolymerization, in aqueous emulsion, of monomers such as butadiene, and contain particles whose size is from 0.02 to 0.1 micron. However, for some uses, latices with larger particles are necessary. It has therefore been proposed that the particles should be agglomerated within the latex, after polymerization, either by physical processes or by chemical processes. However, such agglomeration does not occur in an orderly manner, coagulates are formed in the latex, and the granulometric distribution of the particles produced is very wide. In addition, if the polymer is excessively cross-linked, the agglomeration is weak and the formed particles are in the form of bunches which easily break up.

It has also been proposed that agglomerated particles should be formed by introducing an agglomerating agent into the reaction medium before polymerization. However, the presence of the agglomerating agent slows the reaction rate and promotes partial coagulation of the latex.

The process of this invention overcomes these difficulties and makes it possible, with short polymerization cycles and without formation of any coagulates, to prepare latices containing a varying proportion of agglomerated particles whose grain size distribution can be controlled to within narrow limits. In addition, the process makes it possible to produce agglomerated latices whose polymers have a degree of cross-linking which can be varied according to the uses envisaged.

The process comprises effecting polymerization of a conjugated aliphatic diolefin containing from 4 to 8 carbon atoms, alone or in mixture with at least one other copolymerizable monomer, in aqueous emulsion, in the presence of an agglomerating agent, characterized in that the agglomerating agent, which is represented by a polyalkylene glycol, is introduced in the course of polymerization when at least 40% by weight of polymer, or copolymer, which is slightly cross-linked, is formed.

The diolefin can be, for example, butadiene, isoprene, chloroprene, or dimethylbutadiene.

In the case of copolymerization, the diolefin represents at least 20% and preferably at least 50% of the mixture to be polymerized.

The co-monomer is selected from monomers which, with diolefin, give copolymers whose vitrous transition temperature is lower than 0°C. Such monomers include, for example, vinyl aromatic compounds such as styrene, α-methylstyrene, vinyltoluene, acrylonitrile and methacrylonitrile, and alkyl acrylates whose alkyl group has from one to 10 carbon atoms.

Besides such monomers, it is also possible to use a second co-monomer which is selected from carboxylic acids with olefinic unsaturation, and derivatives thereof, among which acrylic, methacrylic, itaconic, maleic and fumaric acids can be mentioned. The amounts of the second co-monomer are from 0.2 to 5% by weight with respect to the mixture to be polymerized.

Emulsion polymerization is carried out in accordance with conventional methods, in the presence of an emulsifying agent and an initiator, with a concentration of monomer or monomer mixture in the reaction medium of from 20 to 70% by weight.

The emulsifying agent used can be conventional anionic agents which are represented in particular by fatty acid salts; alkali metal-alkyl sulphates, -alkyl sulfonates, -aryl sulphates, -aryl sulfonates, -alkylaryl sulphates, -alkylaryl sulfonates, -sulfosuccinates or -alkyl phosphates; and abietic acid salts which may or may not be hydrogenated. They are used at a rate of 0.01 to 5% by weight with respect to the monomer or the mixture of monomers.

The initiator, which is hydrosoluble, is represented more particularly by hydroperoxides, such as hydrogen peroxide; cumene, diisopropylbenzene and paramethane hydroperoxides; and potassium persulfate; and is used in amounts of from 0.05 to 2% by weight with respect to the monomer or the mixture of monomers. These initiators can be associated with a reducing agent, for example, sodium bisulfite, sodium formaldehyde sulphoxylate, polyethyleneamine, sugars such as dextrose, saccharose and metal salts. The amounts of reducing agent used are from 0.05 to 3% by weight with respect to the monomer or the mixture of monomers.

The reaction temperature, which depends on the monomer or monomers and the initiator, used is generally from 25° to 90°C.

The agglomerating agent used is one or more polyalkyleneglycols in an amount of from 1 to 100,000 ppm and preferably less than 10,000 ppm by weight with respect to the dry polymer or copolymer present in the reaction medium at the time of introducing the agglomerating agent.

The agglomerating agent is introduced as a highly dilute aqueous solution in order to achieve good dispersion in the reaction medium. This dispersion can be achieved by utilizing known dispersing systems.

The efficiency of the agglomerating agent can be increased by associating therewith a physical agglomerating means, for example circulating the latex in a homogenizer, such circulation being effected in the course of polymerization after the addition of the agglomerating agent.

The agglomerating agent is added once, several times, or continuously, at a given stage of polymerization, at at least 40% conversion, that is to say, when polymerization is sufficiently advanced for the degree of conversion to be fairly high, without the polymer or copolymer being cross-linked.

The agglomerating agent should not be introduced when the level of conversion is very low as the speed of polymerization is greatly retarded, agglomeration occurs in an unordered manner and crusting occurs in the reaction vessel. It is therefore important for the degree of conversion at the time of agglomeration to be as high as possible.

For this purpose, in order to profit from a high speed of polymerization and to have a high level of conversion and a low degree of cross-linking, a chain limiter is added to the reaction medium. The amount of chain limiter varies with the nature of the limiter and can be up to 3% by weight with respect to the monomer or the mixture of monomers. The chain limiters can include the following by way of example: mercaptans such as: N-dodecylmercaptan, tertiododecylmercaptan; cyclohexene, or halogenated derivatives such as chloroform, bromoform or carbontetrachloride. The chain limiter is added to the reaction medium either before polymerization, or during polymerization before or after agglomeration, depending on the final desired degree of cross-linking.

Polymerization continues during and after agglomeration, until the conversion rate is from 80 to 100%.

In the event that the rubber product is to be put to a use which requires a high degree of cross-linking, it is possible to introduce a cross-linking agent into the reaction medium at any time during polymerization, the proportions of the crosslinking agent being up to 5% by weight of the polymer to be produced. The cross-linking agent is a bifunctional monomer such as divinylbenzene, divinylether, mono-di-, or triethyleneglycol dimethacrylate, vinylmethacrylate or triallylcyanurate.

Although this is not absolutely necessary, it is sometimes of advantage for an amount, of the order of from 0.01 to 5% by weight with respect to the monomer or the mixture of monomers, of an emulsifying agent as described above, to be added at the time of agglomeration, either directly to the latex or to the solution of agglomerating agent.

After polymerization, there is obtained latices whose regularly agglomerated particles have a mean size of from 0.05 to 1 micron and of relatively narrow grain size distribution. The grain size range depends on the polymerization temperature, the nature, amount and mode of introduction of the agglomerating agent, and the time selected for introducing the agglomerating agent. The grain size distribution can also be influenced by the polymerization method. Thus, the process of the invention, when carried out by seeded polymerization, makes it possible entirely to remove the small-diameter particles.

As regards the configuration of the particles, this depends on the moment selected for introducing the agglomerating agent, and on the degree of cross-linking of the polymer at the moment of such introduction. Thus, the earlier the agglomerating agent is introduced and the lower the degree of cross-linking, the more highly spherical are the agglomerated particles. Conversely, the later the agglomerating agent is introduced and the higher the degree of cross-linking, the higher the degree of irregularity of the contours of the agglomerated particles. One of the advantages of the process is that it makes it possible to prepare a very wide range of products, for different uses.

The agglomerated particle latices, according to the invention, can be used in particular in the preparation of synthetic rubber foams and in the synthesis of graft polymers such as ABS, MBS, AMBS, to which they impart markedly better strengthening properties than those of conventional graft polymers.

Illustrative non-limiting examples of the invention are given hereinafter.

EXAMPLES 1 to 6

The substances to be polymerized and also the ingredients necessary for making the emulsion are introduced into autoclaves provided with stirrers. The contents are then heated to 75°C and this temperature is maintained throughout the operations.

In Example 1, which is given by way of comparison, polymerization is carried out without the addition of any agglomerating agent.

In Example 2, which is also given by way of comparison, the agglomerating agent polyoxyethylene having a molecular weight of 20,000 in 0.16/10,000 aqueous soultion is added before polymerization. In Examples 3 and 4, the agglomerating agent is added to the medium over a period of 30 minutes, at two different degrees of conversion.

In Example 5, the chain limiter used is more efficient than that of the other examples. This fact, associated with a greater amount, gives, at the time of introducing the agglomerating agent, a polymer which is very slightly cross-linked.

In Example 6, a cross-linking agent in 200% solution in styrene is added after agglomeration.

In all the examples, polymerization is stopped when the pressure in the autoclave is 1 bar.

The reaction condition and the results obtained are given in Table 1, in which all the amounts are stated in parts by weight.

The diameter of the particles and the grain size range are determined by examining the latex under an electron microscope and counting the particles, after treatment with bromine vapor.

The degree of cross-linking is expressed by the gel rate and the index of swelling of the polymer in benzene. These two characteristics are determined on the product obtained after coagulation of the latex and drying.

A weight $p$ of specimen is placed in a basket of weight $T$, which is immersed in a weighing vessel containing 30 ccm of benzene and which is maintained for 24 hours in the dark at 20°C. The basket with specimen is then placed in a benzene vapor-saturated desiccator, and then weighed. The weight $p_1$ is obtained.

10 ccm of the benzene solution has evaporated, the weight of the dried extract being $p_2$.

The gel rate is given by the formula 100

$$(1 - \frac{3p_2}{p_1}).$$

The swelling index is given by the formula $$\frac{p_1 - T}{p - 3p_2}$$

The higher the gel rate and the lower the swelling index, the higher the degree of cross-linking.

Study of the table shows that, by varying the time at which the agglomerating agent is introduced, and the degree of cross-linking, no difficulty is found in producing latices whose particles have varying characteristics, which are not produced with the processes of the prior art.

EXAMPLE 7

The following are introduced into an autoclave:
— 100 parts by weight of water,
— 0.2 part by weight of potassium hydroxide,
— 80 parts by weight of butadiene,
— 20 parts by weight of butylacrylate,
— 0.2 part by weight of N-dodecylmercaptan,
— 1 part by weight of potassium chloride, — 2 parts by weight of potassium laurate,
— 0.15 part by weight of potassium persulfate.

The mixture is heated at 75°C and maintained at this temperature throughout the reaction.

When the rate of conversion of the monomers is 50%, the following are introduced:
— 2 parts by weight of potassium laurate in 30% solution in water,
— 0.0030 part by weight of polyoxyethylene having a molecular weight of 20,000 in 0.5°/ooo solution in water over a period of 30 minutes.

The reaction is then continued until the pressure is 0.5 bar.
the polymerization time is 12 hours 10 minutes.
The rate of conversion is 95%.
The product obtained has a gel rate of 100%, a swelling index of 17 and a grain size range as follows:
— 30% by weight of particles having a diameter of less than 0.1 $\mu$,
— 60% by weight of particles having a diameter of less than 0.5 $\mu$,
— 80% by weight of particles having a diameter of less than 0.8 $\mu$,
— 95% by weight of particles having a diameter of less than 1 $\mu$.

The agglomerated particles are spheroids of regular contours.

The same test is repeated but without introducing any agglomerating agent, by way of comparison.

The polymerization time is 10 hours and the conversion rate is 98%. The polymer produced has:
— a gel rate of 99.8%,
— a swelling index of 19, and
— a particle diameter of from 0.05 to 0.12 $\mu$.

EXAMPLE 8

Example 7 is repeated, but with 0.5 part of N-dodecylmercaptan instead of 0.2.

The results are as follows:
— polymerization time: 16 hours,
— conversion rate: 93%,
— gel rate: 83%,
— swelling index: 25,
— grain sizes:
  20% by weight of particles having a diameter of less than 0.1 $\mu$,
  80% by weight of particles having a diameter of less than 0.5 $\mu$,
  90% by weight of particles having a diameter of less than 0.8 $\mu$,
  98% by weight of particles having a diameter of less than 1 $\mu$.

The agglomerated particles are regular spheres.

TABLE 1

| EXAMPLES | 1 | 2 | 3 | 4 | 5 | 6 |
|---|---|---|---|---|---|---|
| SUBSTANCES USED | | | | | | |
| Water | 100 | 100 | 100 | 100 | 100 | 100 |
| Potassium hydroxide | 0.35 | 0.35 | 0.35 | 0.35 | 0.35 | 0.35 |
| Potassium persulfate | 0.70 | 0.70 | 0.70 | 0.70 | 0.70 | 0.70 |
| Butadiene | 90 | 90 | 90 | 90 | 90 | 90 |
| Styrene | 10 | 10 | 10 | 10 | 10 | 10 |
| N-dodecyl mercaptan | 0.2 | 0.2 | 0.2 | 0.2 | | |
| Tertiododecyl mercaptan | | | | | 1 | 1 |
| Potassium laurate | 0.6 | 0.6 | 0.6 | 0.6 | 0.6 | 0.6 |
| CHARACTERISTICS OF THE PARTICLES AT THE MOMENT OF INTRODUCTION OF THE AGGLOMERATING AGENT | | | | | | |
| Conversion rate % | | 0 | 50 | 82 | 80 | 71 |
| Diameter $\mu$ | | | 0.16 | 0.19 | 0.19 | 0.175 |
| Gel rate % | | | 55 | 84 | 55 | 50 |
| Swelling index | | | 55 | 25 | 50 | 60 |
| AGGLOMERATION | | | | | | |
| Potassium laurate | 0 | | 0.7 | 1.1 | 1.1 | 1 |
| Ethylene polyoxide | 0 | 0.005 | 0.0025 | 0.004 | 0.004 | 0.0035 |
| % with respect to the polymer formed at the moment of introduction | 0 | | 0.05 | 0.0049 | 0.005 | 0.005 |
| CROSS-LINKING | | | | | | |
| Divinylbenzene | | | | | | 2 |
| RESULTS | | | | | | |
| Reaction time h | 27 | 60 | 32 | 27 | 30 | 31 |
| Conversion rate % | 95 | 90 | 95 | 94 | 93 | 95 |
| CHARACTERISTICS OF THE PARTICLES OF THE LATEX PRODUCED | | | | | | |
| Gel rate % | 88 | 90 | 90 | 88 | 60 | 98 |
| Swelling index | 20 | 18 | 20 | 19 | 40 | 7 |
| Grain size range % by weight of particles of diameter | | | | | | |
| < 0.20 $\mu$ | | All the particles have a diameter of 0.2 $\mu$ | 2 | 5 | 5 | 5 |
| < 0.30 $\mu$ | | | 40 | 75 | 90 | 80 | 75 |
| < 0.50 $\mu$ | | | 50 | 85 | 90 | 90 | 90 |
| < 0.70 $\mu$ | | | 60 | 95 | 95 | 98 | 95 |
| < 1 $\mu$ | | | 65 | 100 | 96 | 100 | 100 |
| Appearance | | Partially coagualated latex Very large particles. Irregular contours | Spheroid Regular contours | Particles stuck together Irregular contours | Spheroid Irregular contours | Spherical Very regular contours |

We claim:

1. A process for the preparation of rubber polymer latices having large particles, which comprises polymerizing in aqueous emulsion a conjugated aliphatic diolefin containing from four to eight carbon atoms, alone or in mixture with at least one copolymerizable monomer, in the presence of 1–100,000 parts per million of an agglomerating agent, characterized in that the agglomerating agent which is represented by a polyalkyleneglycol is introduced in the course of polymerization, i.e., before polymerization has been completed, at a temperature of from 25° to 90°C when at least 40% by weight of a polymer or copolymer, which is slightly cross-linked, is formed.

2. A process according to claim 1, characterized in that the diolefin is represented by butadiene, isoprene, chloroprene, dimethylbutadiene.

3. A process according to claim 1, characterized in that the copolymerizable monomer is selected from vinylaromatic compounds, acrylonitrile and methacrylonitrile, and alkyl acrylates whose alkyl group has from one to 10 carbon-atoms, 4. A process according to claim 1, characterized in that the copolymerizable monomer represents at most 80% of the copolymer.

5. a process according to claim 1, characterized in that the polyalkyleneglycol is used in an amount of from 1 to 100,000 ppm by weight with respect to the polymer present in the reaction medium, at the time of introduction thereof.

6. A process according to claim 1, characterized in that the polyalkyleneglycol is introduced in a single portion, in several fractions, or continuously.

7. A process according to claim 1, characterized in that a physical agglomerating means is associated with the introduction of polyalkleneglycol.

8. A process according to claim 1, characterized in that a chain limiter represented by a mercaptan, cyclohexene or a halogenated derivative is added to the reaction medium in an amount which does not exceed 3% by weight with respect to the monomer or the mixture of monomers.

9. A process according to claim 1, characterized in that a cross-linking agent represented by a bifunctional monomer is added to the reaction medium in an amount not exceeding 5% by weight of the polymer to be produced.

10. A process according to claim 1, characterized in that from 0.01 to 5% by weight with respect to the monomer or to the mixture of monomers of an emulsifying agent is added to the reaction medium at the same time as the agglomerating agent.

11. Latices of polymers and copolymers of conjugated aliphatic diolefin, produced by the process of claim 1, whose regularly agglomerated particles have a mean size of from 0.05 to 1 micron and a narrow grain size distribution, and which occur in the form of spheres or particles with irregular contours.

* * * * *